(12) United States Patent
Lippey et al.

(10) Patent No.: US 11,429,013 B2
(45) Date of Patent: *Aug. 30, 2022

(54) SPECTRAL SHAPING FOR 3D IMAGING

(71) Applicant: Dolby Laboratories Licensing Corporation, San Francisco, CA (US)

(72) Inventors: Barret Lippey, Foster City, CA (US); Martin J. Richards, Gig Harbor, WA (US)

(73) Assignee: DOLBY LABORATORIES LICENSING CORPORATION, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/164,692

(22) Filed: Feb. 1, 2021

(65) Prior Publication Data
US 2021/0232031 A1 Jul. 29, 2021

Related U.S. Application Data

(63) Continuation of application No. 16/806,813, filed on Mar. 2, 2020, now Pat. No. 10,908,486, which is a (Continued)

(51) Int. Cl.
H04N 9/31 (2006.01)
G03B 21/20 (2006.01)
(Continued)

(52) U.S. Cl.
CPC ......... *G03B 21/2013* (2013.01); *G02B 30/23* (2020.01); *G03B 21/2033* (2013.01);
(Continued)

(58) Field of Classification Search
CPC .............. H04N 13/334; H04N 9/3164; G03B 21/2013; G02B 30/23
See application file for complete search history.

(56) References Cited

U.S. PATENT DOCUMENTS 7,784,938 B2  8/2010 Richards
8,928,970 B2  1/2015 Arntsen
(Continued)

FOREIGN PATENT DOCUMENTS

CN  101321987      12/2008
CN  101185210 B    10/2010
(Continued)

*Primary Examiner* — Ryan D Howard

(57) ABSTRACT

A novel light source for a 3D display system includes a plurality of left eye light emitters and a plurality of right eye light emitters. The left eye emitters include a broad spectral distribution emitter and an overlapping narrow spectral distribution emitter in each of the blue, green, and red color bands. Similarly, the right eye emitters include a broad spectral distribution emitter and an overlapping narrow spectral distribution emitter in each of the blue, green, and red color bands. The combined spectral distributions of each of the broad and narrow emitters provide a primary light for each color and for each eye that has a desirable spectral shape, including wide bandwidth and short tail(s). The invention thus minimizes cross-talk and speckling in left- and right-eye images of 3D display systems.

6 Claims, 7 Drawing Sheets

Related U.S. Application Data continuation of application No. 16/338,591, filed as application No. PCT/US2017/053771 on Sep. 27, 2017, now Pat. No. 10,613,424.

(60) Provisional application No. 62/402,923, filed on Sep. 30, 2016.

(51) Int. Cl.
*H04N 13/324* (2018.01)
*G03B 35/20* (2021.01)
*G02B 30/23* (2020.01)
*H04N 13/334* (2018.01)

(52) U.S. Cl.
CPC ........... *G03B 35/20* (2013.01); *H04N 9/3164* (2013.01); *H04N 13/324* (2018.05); *H04N 13/334* (2018.05)

(56) References Cited

U.S. PATENT DOCUMENTS

| | | | |
|---|---|---|---|
| 10,613,424 B2* | 4/2020 | Lippey | H04N 13/324 |
| 10,908,486 B2* | 2/2021 | Lippey | G02B 30/23 |
| 2002/0196414 A1 | 12/2002 | Manni | |
| 2010/0060857 A1 | 3/2010 | Richards | |
| 2010/0225836 A1 | 9/2010 | Ockenfuss | |
| 2012/0112216 A1 | 5/2012 | Kiser | |
| 2012/0287117 A1 | 11/2012 | Weber | |
| 2013/0162952 A1 | 6/2013 | Lippey | |
| 2013/0182320 A1 | 7/2013 | Silverstein | |
| 2013/0182321 A1 | 7/2013 | Silverstein | |
| 2013/0342904 A1 | 12/2013 | Richards | |
| 2015/0277136 A1 | 10/2015 | Lippey | |

FOREIGN PATENT DOCUMENTS

| | | |
|---|---|---|
| CN | 104509106 | 4/2015 |
| CN | 104968256 | 10/2015 |
| JP | 2006301208 | 11/2006 |
| JP | 2013517516 | 5/2013 |
| JP | 2014516218 | 7/2014 |
| JP | 2015513685 | 5/2015 |
| JP | 2015513686 | 5/2015 |
| WO | 2008140787 | 11/2008 |
| WO | 2012112216 | 8/2012 |
| WO | 2016092490 | 6/2016 |

* cited by examiner

SPECTRAL SHAPING FOR 3D IMAGING

CROSS-REFERENCE TO RELATED APPLICATION(S)

This application is a continuation of U.S. patent application Ser. No. 16/806,813 filed Mar. 2, 2020, which is a continuation of U.S. patent application Ser. No. 16/338,591 filed Apr. 1, 2019, now U.S. Pat. No. 10,613,424 issued Apr. 7, 2020, which is the U.S. national stage of International Patent Application No. PCT/US2017/053771 filed Sep. 27, 2017, which claims the benefit of priority to U.S. Provisional Application No. 62/402,923 filed Sep. 30, 2016, all of which are incorporated herein by reference in their entirety.

BACKGROUND OF THE INVENTION

Field of the Invention

This invention relates generally to 3D image display systems, and more particularly to light sources for use in a 3D image display system.

Description of the Background Art

Currently there is a demand for 3D image display systems such as 6-Primary (6P) laser projectors. A 6P laser projector commonly includes two projection lens assemblies that project two respective overlapping images onto a screen. The viewer wears eyewear having specialized lenses wherein one lens filters out one of the images and the other lens filters out the other image. Accordingly, one of the lens assemblies of the 6P laser projector projects a left eye image while the other projects a right eye image. This allows the viewer to perceive both images simultaneously as a single 3D image.

Each of the left eye image and the right eye image are generated by a respective set of red, green, and blue lights. Accordingly, a 6P laser projection system includes 6 lasers, where the left eye lasers have wavelengths $R_L G_L B_L$ for generating the left eye image and the right-eye lasers have wavelengths $R_R G_R B_R$ for generating the right eye image. In order for the lenses of the 3D glasses to differentiate light from the left and right eye lasers, wavelengths $R_L G_L B_L$ must be different than the wavelengths $R_R G_R B_R$ for each color band. Specifically, $R_L$ must have a different wavelength than $R_R$, $G_L$ must have a different wavelength than $G_R$, and $B_L$ must have a different wavelength than $B_R$. If the spectral bands of the primary lights associated with each eye are too close, image cross-talk between the left eye and right eye views can result.

SUMMARY

The present invention overcomes the problems associated with the prior art by providing a light source including emitters with a relatively narrow spectral distributions having relatively short tails. The invention facilitates a reduction of the speckle effect. The invention further facilitates improved separation between spectral bands, which reduces cross-talk between spectral bands within the same color range.

An example light source for a 3D display system includes a first emitter, a second emitter, a third emitter, and a fourth emitter. The first emitter emits light having a first spectral distribution within a first color (e.g., red) range and has a central wavelength and a particular full width at half maximum (FWHM). The second emitter emits light having a second spectral distribution within the first color range, and is spaced apart from the first spectral distribution. The third emitter emits light having a third spectral distribution within the first color range, which overlaps a portion of the first spectral distribution. In addition, the third spectral distribution is spaced apart from the second spectral distribution, has a central wavelength between the central wavelengths of the first spectral distribution and the second spectral distribution, and has a particular FWHM that is smaller than the FWHM of said first spectral distribution. The fourth emitter emits light having a fourth spectral distribution within the first color range. The fourth spectral distribution overlaps a portion of the second spectral distribution, and is spaced apart from the third spectral distribution. In addition, the fourth spectral distribution has a central wavelength between the central wavelengths of the second spectral distribution and the third spectral distribution, and has a particular FWHM that is smaller than a FWHM of the second spectral distribution.

Together, the first and third spectral distributions form a spectral band within the first color range. Similarly, the second and fourth spectral distributions form a second spectral band within the same color range. The relatively narrow, short tail characteristics of the third and fourth spectral distributions enhance the spacing and minimize cross-talk between the two spectral bands in the first color range.

Optionally, the example light source further includes a fifth emitter, a sixth emitter, a seventh emitter and an eighth emitter. The fifth emitter emits light having a fifth spectral distribution within a second color (e.g., green) range. The fifth spectral distribution has a central wavelength and a particular full width at half maximum (FWHM). The sixth emitter emits light having a sixth spectral distribution within the second color range, and the sixth spectral distribution is spaced apart from the fifth spectral distribution. The seventh emitter emits light having a seventh spectral distribution within the second color range. The seventh spectral distribution overlaps a portion of the fifth spectral distribution and is spaced apart from the sixth spectral distribution. Additionally, the seventh spectral distribution has a central wavelength between the central wavelengths of the fifth spectral distribution and the sixth spectral distribution, and has a particular FWHM that is smaller than the FWHM of the fifth spectral distribution. The eighth emitter emits light having an eighth spectral distribution within the second color range. The eighth spectral distribution overlaps a portion of the sixth spectral distribution, and is spaced apart from the seventh spectral distribution. The eighth spectral distribution also has a central wavelength between the central wavelengths of the sixth spectral distribution and the seventh spectral distribution, and has a particular FWHM that is smaller than a FWHM of the sixth spectral distribution.

Together, the fifth and seventh spectral distributions form a spectral band within the second color range. Similarly, the sixth and eighth spectral distributions form a second spectral band within the same color range. The relatively narrow, short tail characteristics of the seventh and eighth spectral distributions enhance the spacing and minimize cross-talk between the two spectral bands in the second color range.

Optionally, the example light source further includes a ninth emitter, a tenth emitter, an eleventh emitter, and a twelfth emitter. The ninth emitter emits light having a ninth spectral distribution within a third color (e.g., blue) range. The ninth spectral distribution has a central wavelength and a particular full width at half maximum (FWHM). The tenth emitter emits light having a tenth spectral distribution within the third color range. The tenth spectral distribution spaced apart from the ninth spectral distribution. The eleventh emitter emits light having an eleventh spectral distribution within the third color range. The eleventh spectral distribution overlaps a portion of the ninth spectral distribution, and is spaced apart from the tenth spectral distribution. The eleventh spectral distribution also has a central wavelength between the central wavelengths of the ninth spectral distribution and the tenth spectral distribution, and has a particular FWHM that is smaller than the FWHM of the ninth spectral distribution. The twelfth emitter emits light having a twelfth spectral distribution within the third color range. The twelfth spectral distribution overlaps a portion of the tenth spectral distribution, and is spaced apart from the eleventh spectral distribution. Additionally, the twelfth spectral distribution has a central wavelength between the central wavelengths of the tenth spectral distribution and the eleventh spectral distribution, and has a particular FWHM that is smaller than a FWHM of the tenth spectral distribution.

Together, the ninth and eleventh spectral distributions form a spectral band within the third color range. Similarly, the tenth and twelfth spectral distributions form a second spectral band within the same color range. The relatively narrow, short tail characteristics of the eleventh and twelfth spectral distributions enhance the spacing and minimize cross-talk between the two spectral bands in the third color range.

In a particular example light source, the FWHM of first spectral distribution is greater than or equal to 4 nanometers, and the FWHM of third spectral distribution is less than or equal to 2 nanometers.

An example light source is also described as follows to include a first emitter, a second emitter, a third emitter, and a fourth emitter. The first emitter emits light having a first spectral distribution within a first color (e.g., red) range. The first spectral distribution has a peak and a tail. The second emitter emits light having a second spectral distribution within the first color range. The second spectral distribution is spaced apart from the first spectral distribution, and has a peak and a tail. The third emitter emits light having a third spectral distribution within the first color range. The third spectral distribution overlaps a portion of the first spectral distribution, and is spaced apart from the second spectral distribution. The third spectral distribution has a peak between the peaks of the first spectral distribution and the second spectral distribution, and has a tail that declines more rapidly than the tail of the first spectral distribution. The fourth emitter emits light having a fourth spectral distribution within the first color range. The fourth spectral distribution overlaps a portion of the second spectral distribution, and spaced apart from the third spectral distribution. The fourth spectral distribution also has a peak between the peaks of the second spectral distribution and the third spectral distribution, and has a tail that declines more rapidly than the tail of the second spectral distribution.

Optionally, the example light source further includes a fifth emitter, a sixth emitter, a seventh emitter, and an eighth emitter. The fifth emitter emits light having a fifth spectral distribution within a second color (e.g., green) range. The fifth spectral distribution has a peak and a tail. The sixth emitter emits light having a sixth spectral distribution within the second color range. The sixth spectral distribution is spaced apart from the fifth spectral distribution and has a peak and a tail. The seventh emitter emits light having a seventh spectral distribution within the second color range. The seventh spectral distribution overlaps a portion of the fifth spectral distribution, and is spaced apart from the sixth spectral distribution. The seventh spectral distribution also has a peak between the peaks of the fifth spectral distribution and the sixth spectral distribution, and has a tail that declines more rapidly than the tail of the fifth spectral distribution. The eighth emitter emits light having an eighth spectral distribution within the second color range. The eighth spectral distribution overlaps a portion of the sixth spectral distribution, and is spaced apart from the seventh spectral distribution. The eighth spectral distribution also has a peak between the peaks of the sixth spectral distribution and the seventh spectral distribution, and has a tail that declines more rapidly than the tail of the sixth spectral distribution.

Optionally, the example light source further includes a ninth emitter, a tenth emitter, an eleventh emitter, and a twelfth emitter. The ninth emitter emits light having a ninth spectral distribution within a third color (e.g., blue) range. The ninth spectral distribution has a peak and a tail. The tenth emitter emits light having a tenth spectral distribution within the third color range. The tenth spectral distribution is spaced apart from the ninth spectral distribution and also has a peak and a tail. The eleventh emitter emits light having an eleventh spectral distribution within the third color range. The eleventh spectral distribution overlaps a portion of the ninth spectral distribution, and is spaced apart from the tenth spectral distribution. The eleventh spectral distribution has a peak between the peaks of the ninth spectral distribution and the tenth spectral distribution, and also has a tail that declines more rapidly than the tail of the ninth spectral distribution. The twelfth emitter emits light having a twelfth spectral distribution within the third color range. The twelfth spectral distribution overlaps a portion of the tenth spectral distribution, and is spaced apart from the eleventh spectral distribution. The twelfth spectral distribution also has a peak between the peaks of the tenth spectral distribution and the eleventh spectral distribution, and has a tail that declines more rapidly than the tail of the tenth spectral distribution.

An example light source for a 3D display system is also described as follows. The light source includes a first plurality of emitters and a second plurality of emitters. The emitters of the first plurality of emitters have overlapping spectral distributions that form a first spectral band within a first color (e.g., red, green, or blue) range. One of the emitters of the first plurality of emitters has a spectral distribution that forms an edge of the first spectral band, and has a full width at half maximum (FWHM) of no more than 2 nanometers. The emitters of the second plurality of emitters have overlapping spectral distributions that form a second spectral band within the first color range but spaced apart from the first spectral band. One of the emitters of the second plurality of emitters has a spectral distribution forming an edge of the second spectral band, and has a full width at half maximum of no more than 2 nanometers. The edge of the first spectral band is on a side of the first spectral band closest to the second spectral band, and the edge of the second spectral band is on a side of the second spectral band closest to the first spectral band. Optionally, at least one other emitter of the first plurality of emitters has a spectral distribution with a FWHM of at least 4 nanometers.

An example method of manufacturing a light source for a 3D display system is also disclosed. The method includes providing a first emitter, providing a second emitter, and providing a third emitter. The first emitter emits light having a first spectral distribution within a first color (e.g., red) range. The first spectral distribution has a central wavelength and a particular full width at half maximum (FWHM). The second emitter emits light having a second spectral distribution within the first color range. The second spectral distribution is spaced apart from the first spectral distribution. The third emitter emits light having a third spectral distribution within the first color range. The third spectral distribution overlaps a portion of the first spectral distribution, and is spaced apart from the second spectral distribution. The third spectral distribution also has a central wavelength between the central wavelengths of the first spectral distribution and the second spectral distribution, and has a particular FWHM that is smaller than the FWHM of the first spectral distribution. The example method further includes assembling the light source to include the first emitter, the second emitter, and the third emitter.

Optionally, the method further includes providing a fourth emitter operative to emit light having a fourth spectral distribution within the first color range. The fourth spectral distribution overlaps a portion of the second spectral distribution, and is spaced apart from the third spectral distribution. The fourth spectral distribution also has a central wavelength between the central wavelengths of the second spectral distribution and the third spectral distribution, and has a particular FWHM that is smaller than a FWHM of the second spectral distribution. The step of assembling the light source includes assembling the light source to include the fourth emitter.

Optionally, the example method further includes providing a fifth emitter, providing a sixth emitter, providing a seventh emitter, and providing an eighth emitter. The fifth emitter emits light having a fifth spectral distribution within a second color (e.g., green) range. The fifth spectral distribution has a central wavelength and a particular full width at half maximum (FWHM). The sixth emitter emits light having a sixth spectral distribution within the second color range. The sixth spectral distribution is spaced apart from the fifth spectral distribution. The seventh emitter emits light having a seventh spectral distribution within the second color range. The seventh spectral distribution overlaps a portion of the fifth spectral distribution, and is spaced apart from the sixth spectral distribution. The seventh spectral distribution also has a central wavelength between the central wavelengths of the fifth spectral distribution and the sixth spectral distribution, and has a particular FWHM that is smaller than the FWHM of the fifth spectral distribution. The eighth emitter emits light having an eighth spectral distribution within the second color range. The eighth spectral distribution overlaps a portion of the sixth spectral distribution, and is spaced apart from the seventh spectral distribution. The eighth spectral distribution also has a central wavelength between the central wavelengths of the sixth spectral distribution and the seventh spectral distribution, and has a particular FWHM that is smaller than a FWHM of the sixth spectral distribution. The step of assembling the light source includes assembling the light source to include the fifth emitter, the sixth emitter, the seventh emitter, and the eighth emitter.

Optionally, the example method further includes providing a ninth emitter, providing a tenth emitter, providing an eleventh emitter, and providing a twelfth emitter. The ninth emitter emits light having a ninth spectral distribution within a third color (e.g., blue) range.

The ninth spectral distribution has a central wavelength and a particular full width at half maximum (FWHM). The tenth emitter emits light having a tenth spectral distribution within the third color range. The tenth spectral distribution is spaced apart from the ninth spectral distribution. The eleventh emitter emits light having an eleventh spectral distribution within the third color range. The eleventh spectral distribution overlaps a portion of the ninth spectral distribution, and is spaced apart from the tenth spectral distribution. The eleventh spectral distribution also has a central wavelength between the central wavelengths of the ninth spectral distribution and the tenth spectral distribution, and has a particular FWHM that is smaller than the FWHM of the ninth spectral distribution. The twelfth emitter emits light having a twelfth spectral distribution within the third color range. The twelfth spectral distribution overlaps a portion of the tenth spectral distribution, and is spaced apart from the eleventh spectral distribution. The twelfth spectral distribution also has a central wavelength between the central wavelengths of the tenth spectral distribution and the eleventh spectral distribution, and has a particular FWHM that is smaller than a FWHM of the tenth spectral distribution. The step of assembling the light source includes assembling the light source to include the ninth emitter, the tenth emitter, the eleventh emitter, and the twelfth emitter.

Optionally, the step of assembling the light source includes combining the first emitter, the third emitter, the fifth emitter, the seventh emitter, the ninth emitter, and the eleventh emitter into a module adapted to provide light to a first projector, and combining the second emitter, the fourth emitter, the sixth emitter, the eighth emitter, the tenth emitter, and the twelfth emitter into a module adapted to provide light to a second projector.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a 3D 6P display system that incorporates a plurality of narrow band emitters to reduce the effects of color crosstalk. In the following description, numerous specific details are set forth (e.g., wavelengths, color ranges, emitter intensities, etc.) in order to provide a thorough understanding of the invention. Those skilled in the art will recognize, however, that the invention may be practiced apart from these specific details. In other instances, details of well-known video and image processing practices and components have been omitted, so as not to unnecessarily obscure the present invention.

Figure 1:
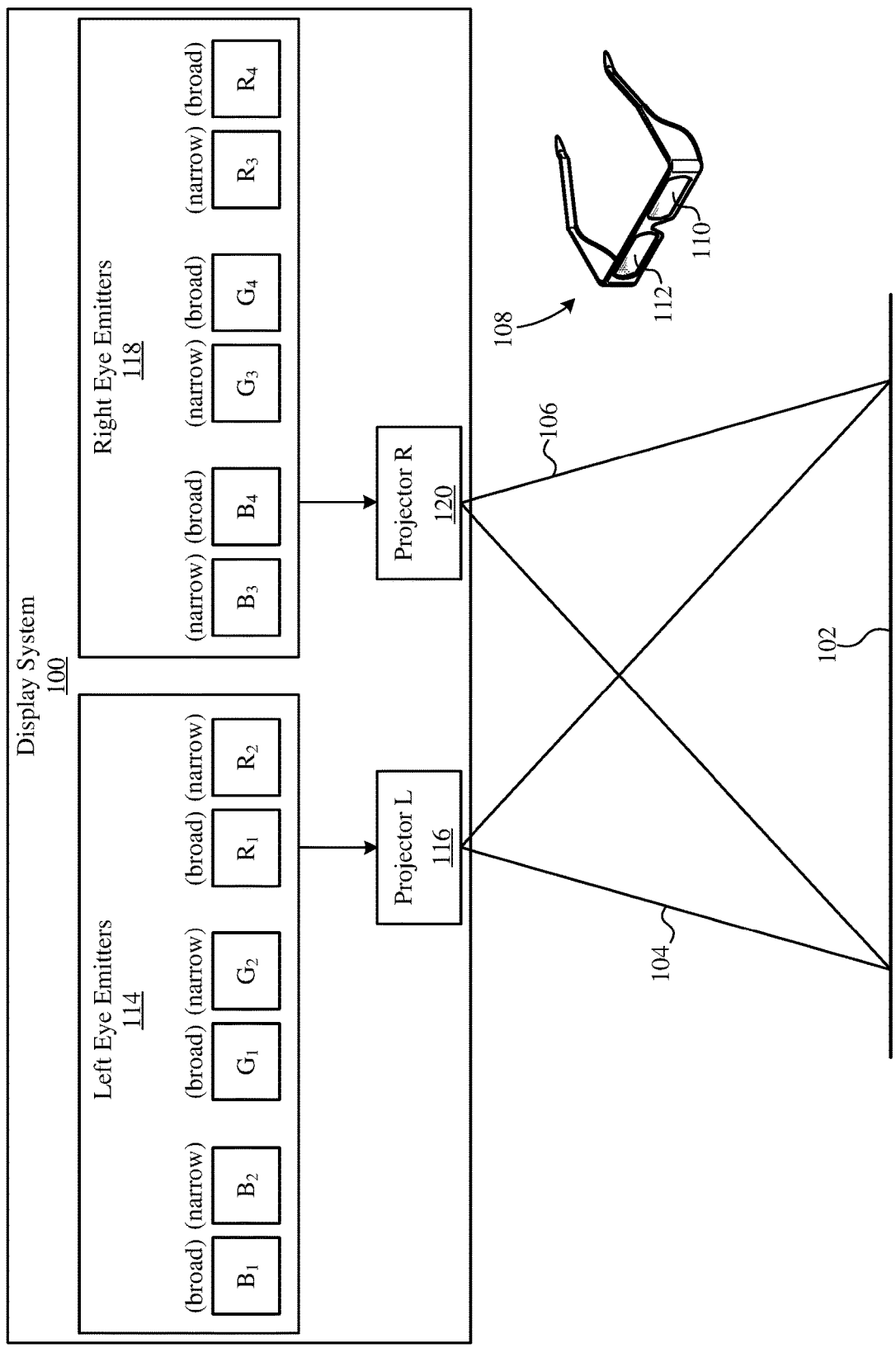
FIG. 1 is a block diagram of an exemplary 3D projector system according to the invention.

FIG. 1 shows a block diagram of an exemplary 3D display system 100 capable of displaying 3D images with improved crosstalk performance In this example embodiment, display system 100 is a 6P laser projector that projects 3D images and video on a viewing surface 102 (e.g. a theater screen). The 3D images are produced by projecting a left eye image 104 and a right eye image 106 onto viewing surface 102. The viewer wears specialized eyewear 108 that enables the left eye image 104 to be viewed only by the viewer's left eye and the right eye image 106 to be viewed only by the viewer's right eye. In other words, a left lens 110 and a right lens 112 of eyewear 108 filter out right eye image 106 and left eye image 104, respectively.

3D display system 100 includes a plurality of left eye emitters 114, a left eye image projector 116, a plurality of right eye emitters 118, and a right eye image projector 120. Emitters 114 and projector 116, together, cooperate to generate left eye image 104. That is, emitters 114 provide projector 116 the necessary illumination to generate image 104. Likewise, emitters 118 provide projector 120 the necessary illumination to generate image 106. Projectors 116 and 120 are representational of the various components (e.g., spatial light modulators, projection lenses, light pipes, etc.) necessary carry out image modulation and projection functions. The specific details of projectors 116 and 120 are not essential aspects of the present invention and are, therefore, not described in detail.

In this exemplary embodiment, emitters 114 and 118 are primary color laser modules, each producing laser light over a unique wavelength band. Emitters 114 include a broad bandwidth blue laser B1, a narrow bandwidth blue laser B2, a broad bandwidth green laser G1, a narrow bandwidth green laser G2, a broad bandwidth red laser R1,and a narrow bandwidth red laser R2, each of which is not visible through right lens 112 of eyewear 108. Likewise, emitters 118 include a broad bandwidth blue laser B3, a narrow bandwidth blue laser B4, a broad bandwidth green laser G3, a narrow bandwidth green laser G4, a broad bandwidth red laser R3,and a narrow bandwidth red laser R4, each of which is not visible through left lens 110.

Figure 2:
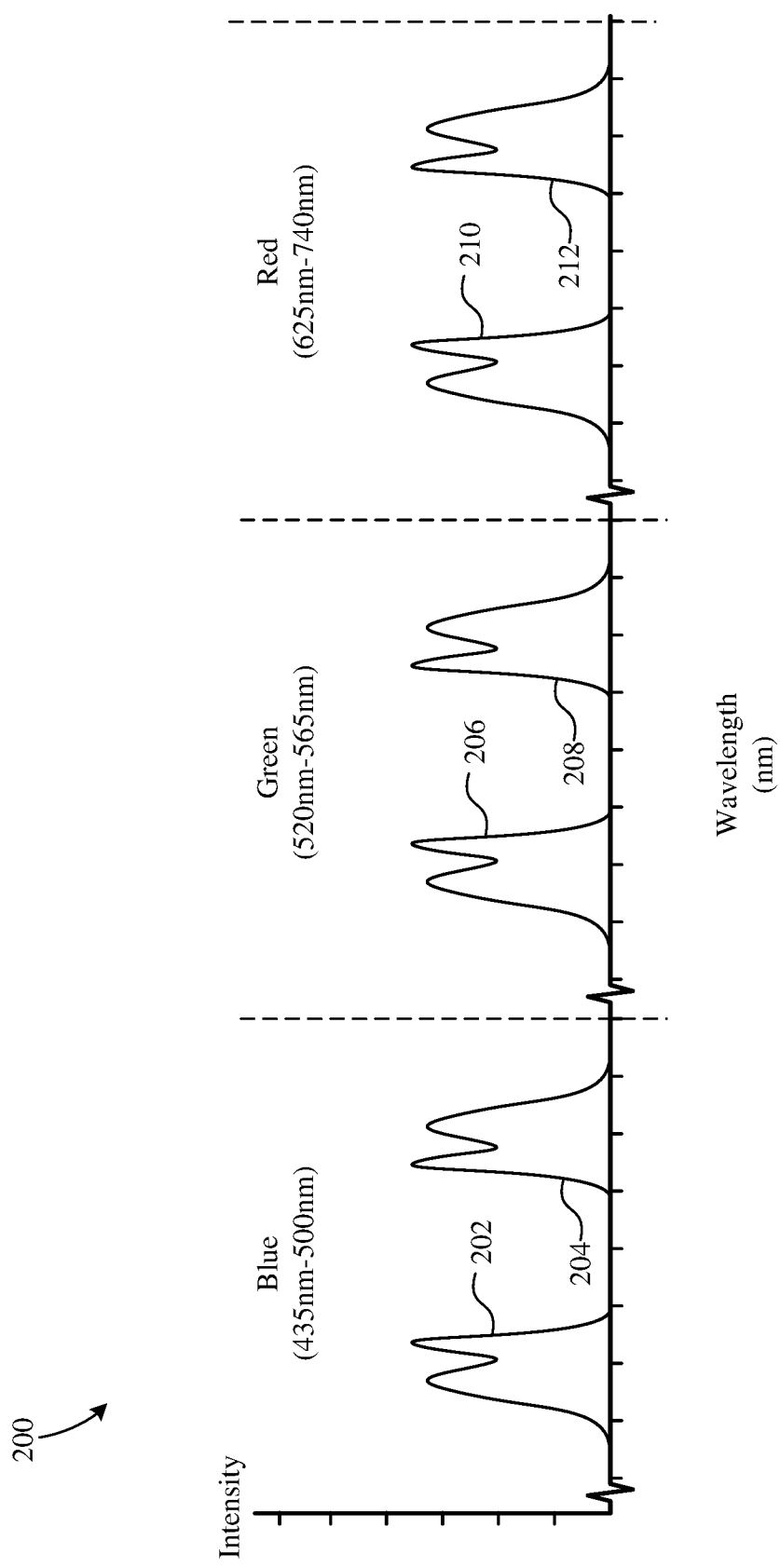
FIG. 2 is an intensity verses wavelength graph showing the spectral distribution of the emitters of FIG. 1.

FIG. 2 is an intensity verses wavelength graph 200 showing the spectral distribution curves of blue, green, and red light generated by left eye emitters 114 and right eye emitters 118. (Intensity is shown representationally in arbitrary units.) Curves 202, 204, 206, 208, 210, and 212 represent the respective 6 primary color bands used by display system 100 to generate 3D images. Curve 202 represents the combined spectral distributions of the B1 and B2 lasers which, together, define the primary blue constituent of left eye image 104. Curve 204 represents the combined spectral distributions of the B3 and B4 lasers which, together, define the primary blue constituent of right eye image 106. Curve 206 represents the combined spectral distributions of the G1 and G2 lasers which, together, define the primary green constituent of left eye image 104. Curve 208 represents the combined spectral distributions of the G3 and G4 lasers which, together, define the primary green constituent of right eye image 106. Curve 210 represents the combined spectral distributions of the R1 and R2 lasers which, together, define the primary red constituent of left eye image 104. Finally, curve 212 represents the combined spectral distributions of the R3 and R4 lasers which, together, define the primary green constituent of right eye image 106.

For illustrative purposes, the general shape of curves 202, 206, and 210 are shown to be identical to one another. Likewise, the general shape of curves of 204, 208, and 212 are shown to be identical to one another. However, those skilled in the art will recognize that in reality, it is unlikely that these curves will be identical. This is partly because of manufacturing limitations and also because the achievable intensity and wavelength characteristics of lasers vary from one bandwidth to another and also from one manufacturer to another.

Figure 3:
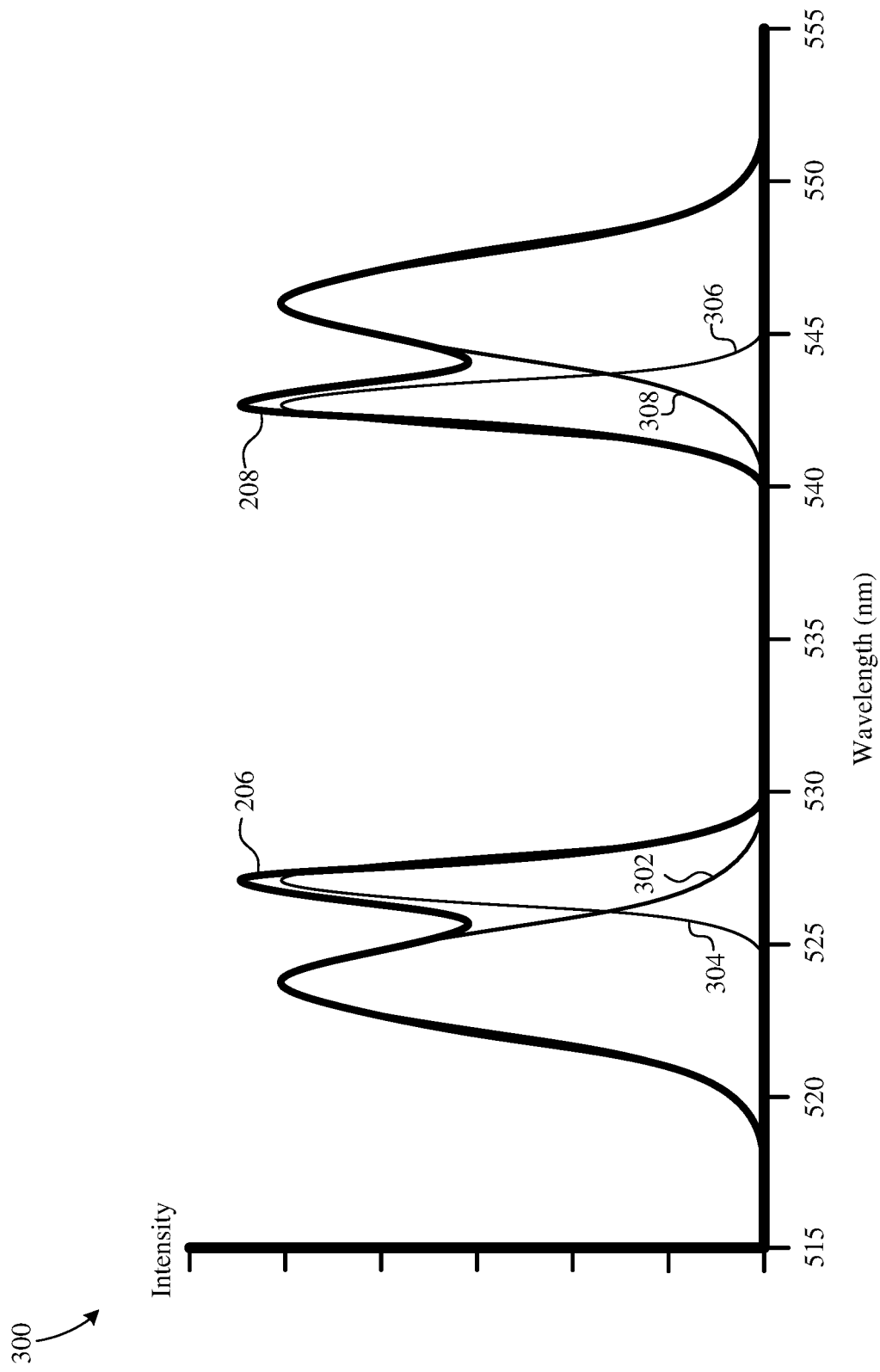
FIG. 3 is an intensity verses wavelength graph showing the spectral distribution of the green emitters of FIG. 1.

FIG. 3 is an intensity verses wavelength graph 300 showing constituents of spectral distribution curves 206 and 208 within the green color range. In the example embodiment, curve 206 represents the summation of overlapping curves 302 and 304, which represent the spectral distributions of the G1 and G2 lasers, respectively. Likewise, curve 208 represents the summation of overlapping curves 306 and 308, which represent the spectral distributions of the G3 and G4 lasers, respectively.

Selection of lasers can be based on several considerations. For example, each laser has a generally-Gaussian spectral distribution. Additionally, increasing laser bandwidth has been found to reduce the speckle effect. Furthermore, the usable wavelength range available for a particular color is limited by a desired color space. Two different lasers of the same color, but for different eyes, must also fit within the desired color space range without overlapping, which can further limit the available wavelengths for each color. Furthermore, lasers of some wavelengths are difficult to manufacture, and it might be desirable to avoid some ranges of wavelengths altogether depending on the application.

The spectral characteristics and relative positioning of curves 302, 304, 306, and 308 provide beneficial aspects of the present invention, particularly in view of the above considerations. For instance, recognize that curves 304 and 306 occupy a much shorter band of wavelengths at full-width at half-maximum (FWHM) than do curves 302 and 308. Broad curve 302 occupies a relatively long band of wavelengths at FWHM so as to minimize speckle. However, broad spectral curves having a relatively long FWHM also inherently suffer from a gradual Gaussian tail, which is undesirable because crosstalk results when the tail of a left eye spectral distribution overlaps the tail of a right eye spectral distribution within like color ranges. Furthermore, long tails occupy more of the already limited bandwidth of a color range, thus putting further design constraints on the system. In order to minimize the effects of the longwave tail of curve 302, G2 has a narrow FWHM within the same wavelength range as the longwave tail of curve 302. This is desirable because a narrow curve generally has a shorter, sharper tail. As a result, curve 206 has a relatively large bandwidth to reduce speckle, yet has a short tail to reduce crosstalk. For the same reason, G3 has a narrow spectral distribution curve 306 within the same wavelength range as the longwave tail of broad curve 308. It is important to recognize that narrow curves 304 and 306 are located in the green band between the peaks of broad curves 302 and 308, thus minimizing crosstalk between left image green and right image green in the projected images.

It should be noted that the beneficial characteristics of blue curves 202 and 204, and red curves 210 and 212 provided by the invention, are substantially similar to those of green curves 206 and 208, respectively, discussed above. Therefore, detailed descriptions of curves 202, 204, 210, and 212 are omitted so as to avoid redundancy.

In summary, the spectral shaping provided by the introduction of the narrow band emitters according to the invention provides important advantages. Specifically, the invention facilitates improved separation between spectral bands within the same color ranges, which reduces cross-talk in the displayed left eye and right eye images. Additionally, the invention provides for wide composite spectral bands, which reduces speckle. These improvements are particularly beneficial for sharpening red and green, where crosstalk and speckle can be more visible (as compared to blue).

Figure 4:
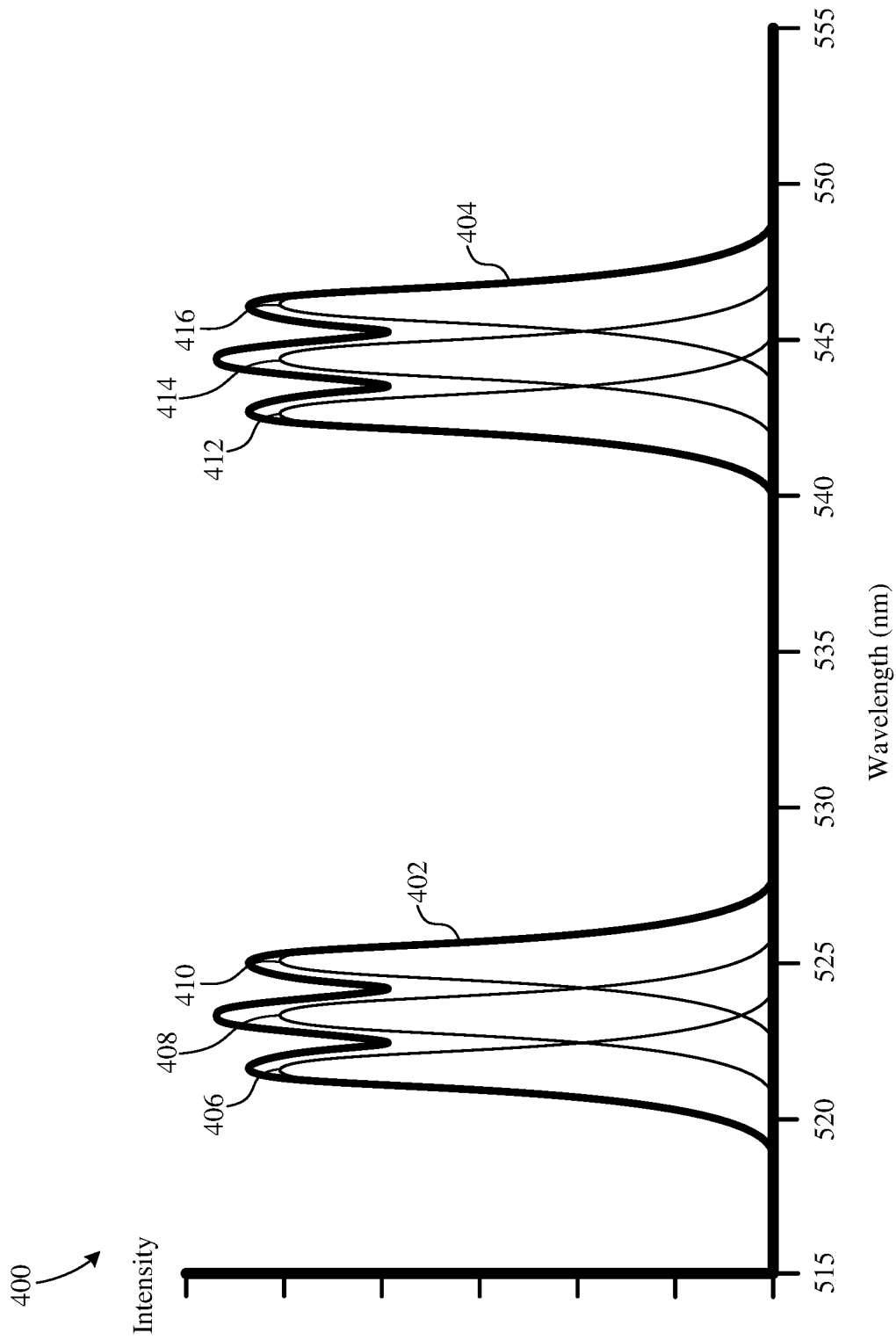
FIG. 4 is an intensity verses wavelength graph showing the spectral distribution of green emitters according to an alternative embodiment of the invention.

FIG. 4 is an intensity verse wavelength graph 400 showing constituents of a shortwave green curve 402 and a longwave green curve 404 according to an alternative embodiment of the present invention. In the example embodiment, curve 402 represents the combined spectral distribution of three overlapping narrow FWHM green lasers represented by curves 406, 408, and 410. Likewise, curve 404 represents the total spectral distribution of three narrow FWHM longwave green lasers represented by curves 412, 414, and 416. Because each of curves 402 and 404 is made up of a plurality of overlapping narrow FWHM curves, curves 402 and 404 have wide bandwidths for speckle reduction, yet have short tails to minimize crosstalk therebetween.

Figure 5:
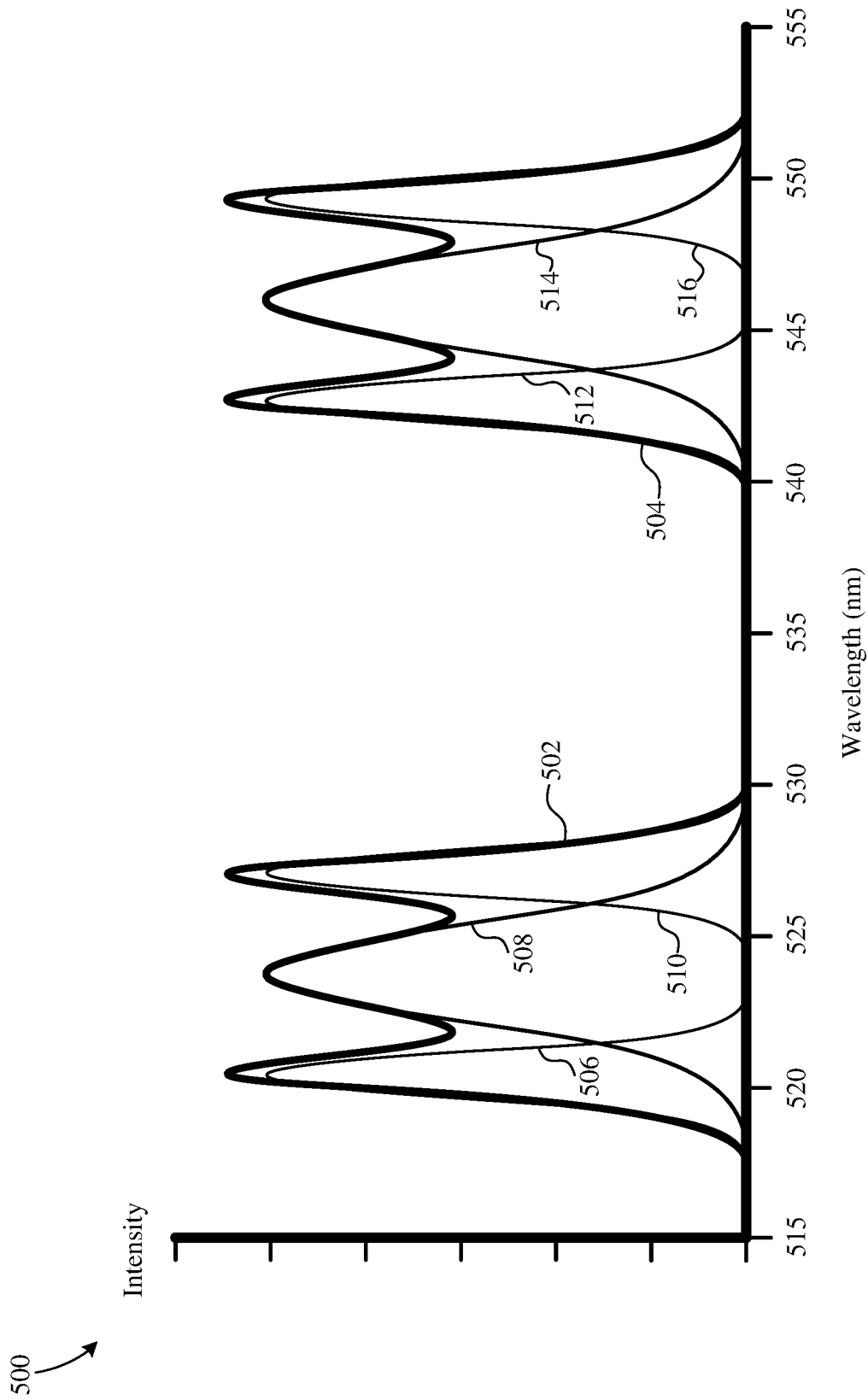
FIG. 5 is an intensity verses wavelength graph showing the spectral distribution of green emitters according to yet another alternative embodiment of the invention.

FIG. 5 is an intensity verses wavelength graph 500 showing constituents of a shortwave green curve 502 and a longwave green curve 504 according to another alternative embodiment of the present invention. In the example embodiment, curve 502 represents the total spectral distribution of a narrow FWHM green laser represented by a curve 506, a broad FWHM green laser represented by a curve 508, and a second narrow FWHM green laser represented by a curve 510. Likewise, curve 504 represents the total spectral distribution of a narrow FWHM green laser represented by a curve 512, a broad FWHM green laser represented by a curve 514, and a second narrow FWHM green laser represented by a curve 516. Because each of curves 502 and 504 include a single broad curve positioned between two narrow curves, each has a wide bandwidth for speckle reduction yet has short tails to minimize crosstalk.

Figure 6A:
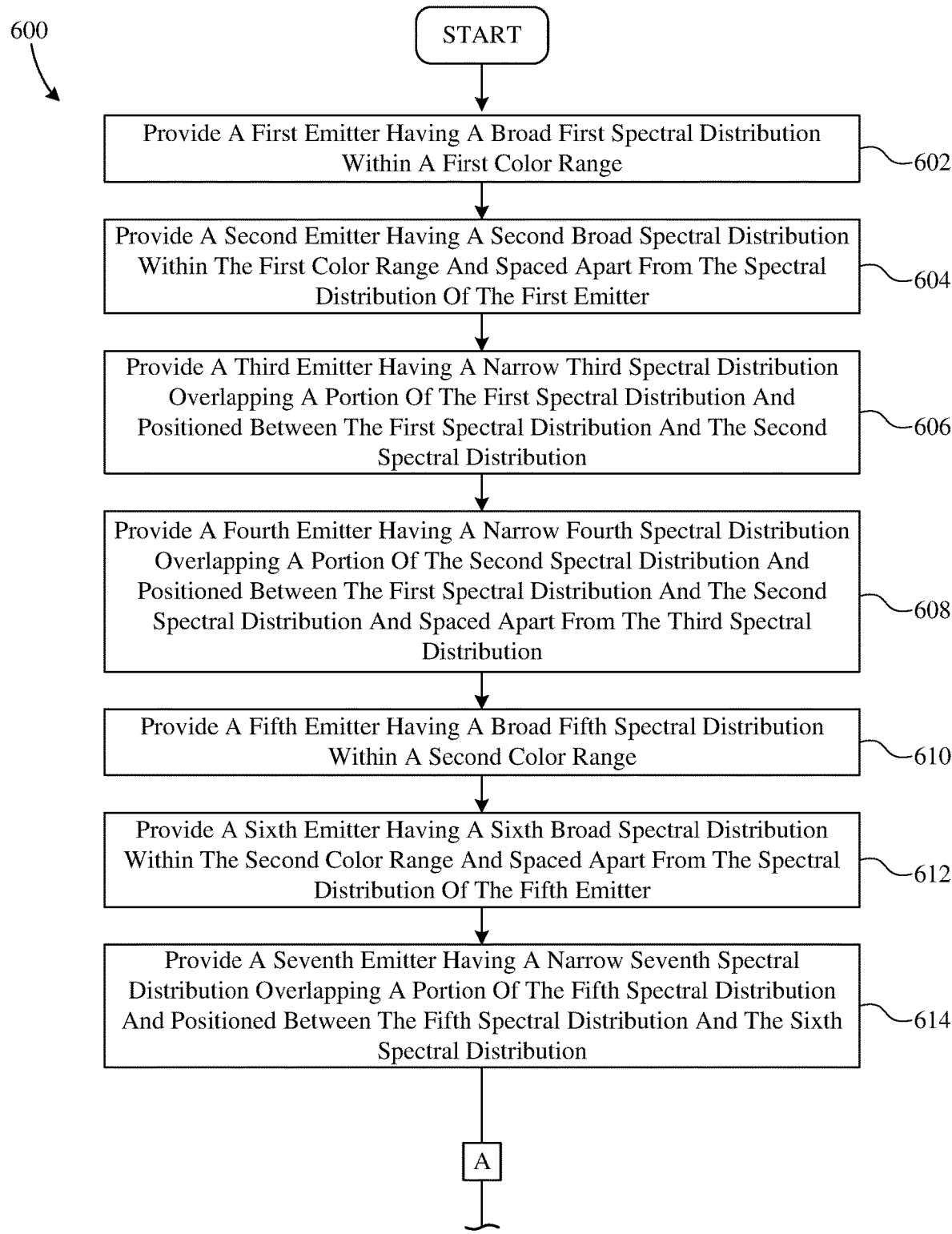
FIG. 6A is a first portion of a flowchart summarizing a method of manufacturing a light source for a 3D display system according to the invention.
Figure 6B:
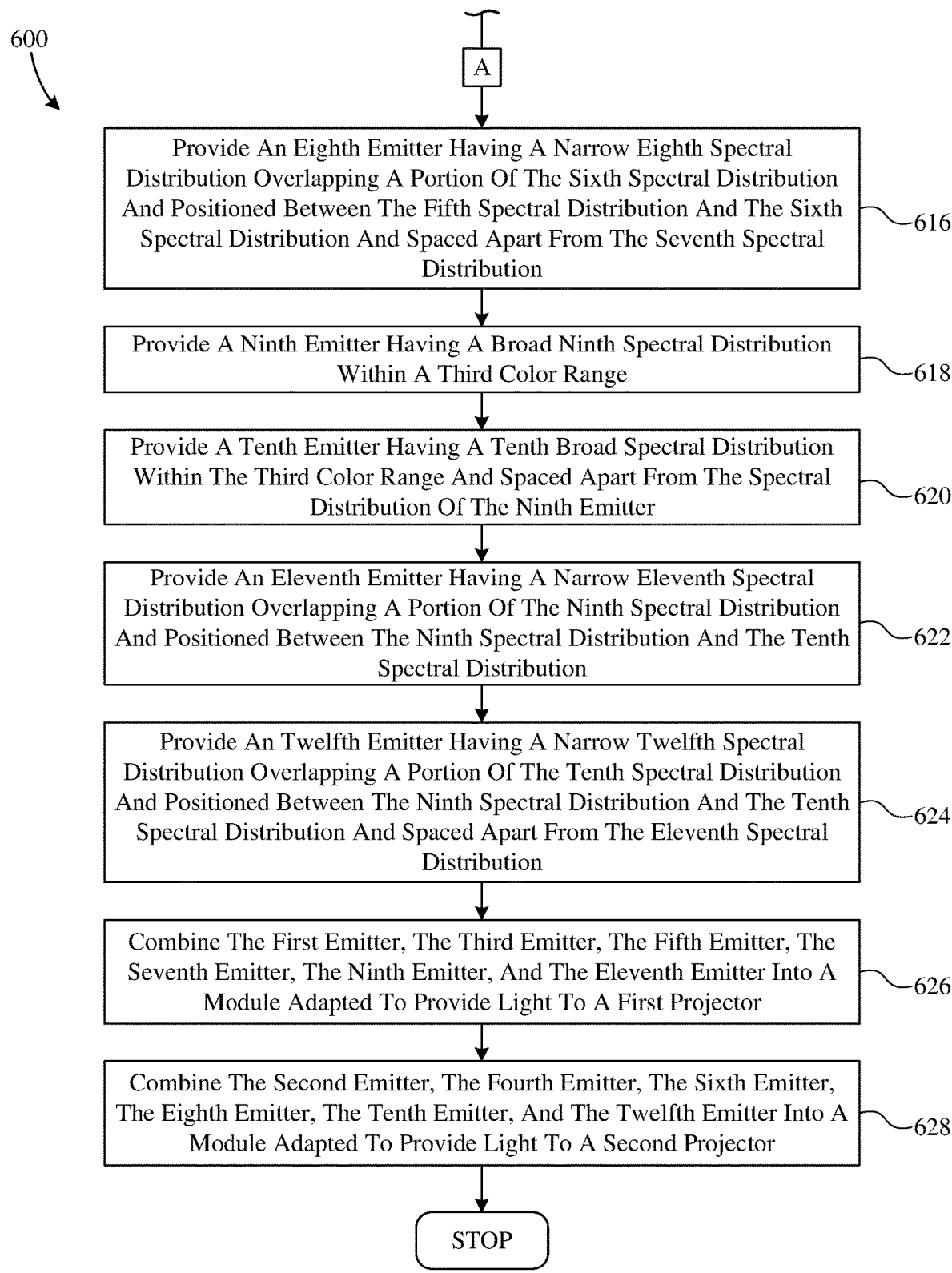
FIG. 6B is a second portion of a flowchart summarizing a method of manufacturing a light source for a 3D display system according to the invention.

FIGS. 6A and 6B are portions of a flowchart summarizing a method 600 of manufacturing a light source for a 3D display system. In a first step 602, a first emitter having a broad first spectral distribution within a first color range is provided. In a second step 604, a second emitter having a second broad spectral distribution within the first color range and spaced apart from the spectral distribution of the first emitter is provided. In a third step 606, a third emitter having a narrow third spectral distribution overlapping a portion of the first spectral distribution and positioned between the first spectral distribution and the second spectral distribution is provided. In a fourth step 608, a fourth emitter having a narrow fourth spectral distribution overlapping a portion of the second spectral distribution and positioned between the first spectral distribution and the second spectral distribution and spaced apart from the third spectral distribution is provided.

In a fifth step 610, a fifth emitter having a broad fifth spectral distribution within a second color range is provided. In a sixth step 612, a sixth emitter having a sixth broad spectral distribution within the second color range and spaced apart from the spectral distribution of the fifth emitter is provided. In a seventh step 614, a seventh emitter having a narrow seventh spectral distribution overlapping a portion of the fifth spectral distribution and positioned between the fifth spectral distribution and the sixth spectral distribution is provided. In an eighth step 616 (FIG. 6B), an eighth emitter having a narrow eighth spectral distribution overlapping a portion of the sixth spectral distribution and positioned between the fifth spectral distribution and the sixth spectral distribution and spaced apart from the seventh spectral distribution is provided.

In a ninth step 618, a ninth emitter having a broad ninth spectral distribution within a third color range is provided. In a tenth step 620, a tenth emitter having a tenth broad spectral distribution within the third color range and spaced apart from the spectral distribution of the ninth emitter is provided. In an eleventh step 622, an eleventh emitter having a narrow eleventh spectral distribution overlapping a portion of the ninth spectral distribution and positioned between the ninth spectral distribution and the tenth spectral distribution is provided. In a twelfth step 624, a twelfth emitter having a narrow twelfth spectral distribution overlapping a portion of the tenth spectral distribution and positioned between the ninth spectral distribution and the tenth spectral distribution and spaced apart from the eleventh spectral distribution is provided.

In a thirteenth step 626, the first emitter, the third emitter, the fifth emitter, the seventh emitter, the ninth emitter, and the eleventh emitter are combined into a module adapted to provide light to a first projector. Additionally, in a fourteenth step 628, the second emitter, the fourth emitter, the sixth emitter, the eighth emitter, the tenth emitter, and the twelfth emitter are combined into a module adapted to provide light to a second projector.

The description of particular embodiments of the present invention is now complete. Many of the described features may be substituted, altered or omitted without departing from the scope of the invention. For example, lasers (or other narrow-band light sources) of alternative bandwidths, may be substituted for the specific lasers described. These and other deviations from the particular embodiments shown will be apparent to those skilled in the art, particularly in view of the foregoing disclosure.

What is claimed is:

1. A light source for a 3D display system, said light source comprising:
a first plurality of emitters having overlapping spectral distributions that form a first spectral band within a first color range, one of said emitters of said first plurality of emitters having a spectral distribution forming an edge of said first spectral band; and
a second plurality of emitters having overlapping spectral distributions that form a second spectral band within said first color range but spaced apart from said first spectral band, one of said emitters of said second plurality of emitters having a spectral distribution forming an edge of said second spectral band; and wherein:
said edge of said first spectral band is on a side of said first spectral band closest to said second spectral band;
said edge of said second spectral band is on a side of said second spectral band closest to said first spectral band.

2. The light source of claim 1, wherein said first color range is within a red portion of the visible spectrum.

3. The light source of claim 1, wherein at least one other emitter of said first plurality of emitters has a spectral distribution with a full width at half maximum (FWHM) of at least 4 nanometers.

4. The light source of claim 1, wherein at least one other emitter of said second plurality of emitters has a spectral distribution with a FWHM of at least 4 nanometers.

5. The light source of claim 1, wherein one of said emitters of said first plurality of emitters have a FWHM of no more than 2 nanometers.

6. The light source of claim 1, wherein one of said emitters of said second plurality of emitters have a FWHM of no more than 2 nanometers.

* * * * *